United States Patent [19]
Wasai et al.

[11] Patent Number: 5,929,135
[45] Date of Patent: Jul. 27, 1999

[54] LOW-VISCOSITY AQUEOUS INK FOR A BALL-POINT PEN AND A BALL-POINT PEN

[75] Inventors: Eiji Wasai, Fujioka; Kazuhiko Furukawa, Kouza-gun, both of Japan

[73] Assignee: Mitsubishi Pencil Kabushiki Kaisha, Tokyo, Japan

[21] Appl. No.: 08/888,358

[22] Filed: Jul. 3, 1997

Related U.S. Application Data

[63] Continuation of application No. 08/594,246, Jan. 30, 1996, abandoned

[30] Foreign Application Priority Data

Feb. 1, 1995 [JP] Japan ................................. 7-014988
Apr. 12, 1995 [JP] Japan ................................. 7-110242

[51] Int. Cl.$^6$ .............................. C09D 11/18; B43K 7/02
[52] U.S. Cl. ..................... 523/161; 524/522; 524/832; 260/DIG. 38; 401/209; 401/216; 401/217; 401/219
[58] Field of Search .............................. 523/161; 524/522, 524/832; 260/DIG. 38; 401/209, 216, 217, 219

[56] References Cited

U.S. PATENT DOCUMENTS 5,709,493  1/1998  Kobayashi et al. ..................... 401/219

FOREIGN PATENT DOCUMENTS

| 57-49678 | 3/1982 | Japan . |
| 4-53987 | 12/1992 | Japan . |
| 6-57194 | 3/1994 | Japan . |
| 6-328891 | 11/1994 | Japan . |

*Primary Examiner*—Marion McCamish
*Assistant Examiner*—John J. Guarriello
*Attorney, Agent, or Firm*—Darby & Darby

[57] ABSTRACT

This invention provides a ball-point pen suited to low-viscosity aqueous ink. This ball-point pen includes a ball-point pen refill in which an ink reservoir communicates with a tip for holding a tip ball via a joint, wherein the ink reservoir is filled with water type ball-point pen ink containing at least one type of a solvent selected from the group consisting of ethyleneglycol, diethyleneglycol, propyleneglycol, and glycerin in an amount of 5 to 40 wt % of the total ink amount, a crosslinking acrylic acid polymer in an amount of 0.1 to 1.0 wt % of the total ink amount, a pigment in an amount of 5 to 10 wt % of the total ink amount, and the balance primarily consisting of water, and the tip has a spring which in a normal state urges and brings the tip ball into intimate contact with the inner edge of a ball holding portion at the front end of the tip and releases the intimate contact when writing is performed.

11 Claims, 11 Drawing Sheets

LOW-VISCOSITY AQUEOUS INK FOR A BALL-POINT PEN AND A BALL-POINT PEN

This is a continuation of application Ser. No. 08/594,246, filed Jan. 30, 1996 now abandoned.

BACKGROUND OF THE INVENTION (1) Field of the Invention

The present invention relates to low-viscosity pigment aqueous ink for a ball-point pen and to a ball-point pen. More specifically, the present invention is directed to an aqueous ink to be supplied to a so-called direct reservation type ball-point pen using an ink reservoir which directly reserves ink without using an ink absorber body or an ink feeder, and to a ball-point pen using the aqueous ink.

(2) Description of the Prior Art

A ball-point pen includes a writing tip consisting of a ball and a tip holder, an ink reservoir, a barrel, and the like components. Writing by a ball-point pen of this sort is done in such a manner that ink flowing out from the inside of the writing tip as the ball in the tip rotates or rolls transfers onto or penetrates into a recording medium such as paper. Traces of writing are particularly formed by the transfer.

An aqueous ink for a ball-point pen has a low viscosity of a few mPa·S or lower and therefore a ball-point pen using the aqueous ink has the advantage of allowing writing at low writing pressures. This results in a good touch of writing. However, aqueous ball-point pens readily bring about a forward flow phenomenon in which ink flows out from the writing tip or, conversely, a backward flow phenomenon in which the air enters from the tip of a ball-point pen to flow out ink. Conventionally, these phenomena are prevented by use of a fiber sliver called inner cotton. Also, if a ball-point pen of this sort is left unused with no cap on it, the vapor pressure of a solvent increases to dry up the solvent. Consequently, the writing tip dries and ink no longer flows out, making writing impossible.

On the other hand, conventionally known oil type ball-point pens use high-viscosity ink having a viscosity of a few thousand mPa·S or higher. This results in a bad touch of writing because the ball rotates with a high resistance when ink flows out from the writing tip. Also, only a small amount of ink flows out from the writing tip during writing. This leads to ink-blotting, unevenness of writing traces, a low writing density, and the need for a high writing pressure.

As an improvement of these oil type ball-point pens, a ball-point pen for aqueous ink, called medium-viscosity ink, having a medium viscosity (a few mPa-S to a few thousand mPa·S) between the viscosities of the aqueous ink and the oily ink described above, has recently been developed. This ball-point pen makes use of aqueous ink with a relatively low viscosity which has a so-called shear thinning viscosity by which the viscosity decreases due to rotation of the tip ball and ink smoothly flows out. Unfortunately, since ink readily dries in this ball-point pen, a cap for sealing the writing tip is necessary. Also, the low viscosity readily brings about an ink backward or forward flow phenomenon. Furthermore, unclear traces of writing easily take place due to falling or knocking impacts. Accordingly, no ideal low-viscosity aqueous ink ball-point pen has been obtained yet because a touch of writing, backward and forward flow phenomena, cap-off performance, and a pen structure influence each other.

Japanese Patent Application Laid-open No. Hei 6-57194 has disclosed ink for aqueous ball-point pens, which uses a dye, a moisture retaining and wetting agent, and a crosslinking acrylic acid polymer as a thixotropic property imparting agent. Pigments have no resolubility characteristics, and so their dispersions become unstable with time. Therefore, pigments are inferior to dyes in the performance as aqueous ink for use in direct reservation type ball-point pens. Furthermore, Japanese Patent Publication No. Hei 6-57194 describes that pigments wear the ball in the writing tip during writing and thereby shorten the life of writing.

Generally, when dyes are used the ink components neither easily dry nor solidify in the writing tip. This prevents drying of the writing tip while a cap is removed and allows a smooth outflow of ink during writing. Dyes are superior to pigments in a so-called non-drying property. However, when used in a cap-less, portable ball-point pen, dyes are unsatisfactory in the properties of preventing a flow of ink from the writing tip, a so-called forward flow, when the writing tip is directed downward. This may contaminate user's clothes or the like.

Ink using natural resins such as xanthan gum and guar gum, acryl- and urethane-based synthetic polymers, and inorganic substances such as smectite and montmorillonite is also known. Unfortunately, this type of ink has an unsatisfactory moisture retention in the writing tip. Therefore, if a ball-point pen using the ink is left unused with no cap on it, unclear traces of writing may occur due to dry-up and, in the worst case, writing becomes impossible. This results in the disadvantage that the ball-point pen must be capped after being used.

In ball-point pens for low-viscosity aqueous ink, a greasy semitransparent non-drying substance called a follower is normally filled in the rear end of an ink reservoir. To prevent ink evaporation, therefore, it is only necessary to reduce evaporation through a gap between the writing tip, i.e., the ball, and the holder. As an example, it is unnecessary to take account of evaporation of ink if a solvent having a very low vapor pressure is primarily used as in the case of oil type ball-point pens. However, water is a prime solvent in aqueous ink, and so it is not possible to prevent evaporation of water only by proper selection of a low-vapor-pressure solvent.

To solve the above problems, a ball-point pen using low-viscosity aqueous ink is possible. Unfortunately, the ink outflow amount is still large in this ball-point pen. To prolong the life of writing, therefore, it is necessary to increase the ink filling amount by increasing the diameter of an ink reservoir. Also, since the ink viscosity is low, a gap may be formed between the tip ball and the tip holder when the writing tip is pointed down. If this is the case, ink oozes out (to cause a forward flow) or the ink outflow amount increases in writing. Furthermore, after writing is done with the writing tip pointed up or when a knocking or falling impact is applied, ink immediately below the tip ball tends to flow backward, resulting in unclear traces of writing.

SUMMARY OF THE INVENTION

It is an object of the present invention to solve the above conventional problems, i.e., to provide low-viscosity aqueous ink for ball-point pens, which does not cause backward and forward flows of ink, which improves the moisture retention in a writing tip, by which a ball-point pen can be left unused with no cap on it, and which solves the conventional drawbacks such as a low stability with time when a pigment is used as a coloring agent and an unsatisfactory property of preventing a forward flow when a dye is used. It is another object of the present invention to provide a direct reservation type aqueous ball-point pen suitable for the low-viscosity aqueous ink for ball-point pens, which is improved in the above conventional drawbacks and has a mechanism for preventing an ink backward flow or an ink forward flow due to a falling impact or upward writing.

The present inventor has made extensive studies on the above subjects and obtained desired low-viscosity aqueous ink for ball-point pens by mixing a specific solvent and a particular amount of a crosslinking acrylic acid polymer in a pigment. The present inventor has also succeeded in obtaining a ball-point pen for low-viscosity aqueous ink which has a specific structure including a ball valve and a spring and uses the ink described above, and in which a backward flow of ink resulting from a falling impact or upward writing is prevented, thereby completing the present invention.

That is, a low-viscosity aqueous ink for ball-point pen according to the present invention contains at least one of a solvent selected from the group consisting of ethyleneglycol, diethyleneglycol, propyleneglycol, and glycerin in an amount of 5 to 40 wt % of a total ink amount, a crosslinking acrylic acid polymer in an amount of 0.1 to 1.0 wt % of the total ink amount, a pigment in an amount of 5 to 10 wt % of the total ink amount, and the balance primarily consisting of water. The amount of the crosslinking acrylic acid polymer is preferably 0.2 to 0.5 wt % of the total ink amount.

The first ball-point pen for low-viscosity aqueous ink according to the present invention comprises a ball-point pen refill in which an ink reservoir communicates with a tip for holding a tip ball via a joint, wherein the ink reservoir is filled with aqueous ball-point pen ink containing at least one of a solvent selected from the group consisting of ethyleneglycol, diethyleneglycol, propyleneglycol, and glycerin in an amount of 5 to 40 wt % of a total ink amount, a crosslinking acrylic acid polymer in an amount of 0.1 to 1.0 wt % of the total ink amount, a pigment in an amount of 5 to 10 wt % of the total ink amount, and the balance primarily consisting of water, and the tip has a spring which in a normal state urges and brings the tip ball into intimate contact with an inner edge of a ball holding portion at a front end of the tip and releases the intimate contact when writing is performed.

Preferably, the spring has a straight rod portion in a front portion thereof. The spring consists of a pressing member having a straight rod for urging the tip ball and a coil spring.

The second ball-point pen for low-viscosity aqueous ink according to the present invention comprises a ball-point pen refill in which an ink reservoir communicates with a tip for holding a tip ball via a joint, wherein the ink reservoir is filled with the above-described aqueous ball-point pen ink, a follower made from a greasy, semitransparent non-drying substance, which can move as ink is consumed during writing and has a property of preventing evaporation of ink, is filled in a rear end of the ink, an inside hollow of the joint has a valve chamber in which a ball valve is loosely fitted, a rear portion of the valve chamber has a ball valve seat which intimately contacts the ball valve and prevents a backward flow of the ink and a conduit which communicates with the ink reservoir from the ball valve seat, a front portion of the valve chamber has a portion in contact with the ball valve and communicates with a rear end of the tip, and the tip has a spring which in a normal state urges and brings the tip ball into intimate contact with an inner edge of a ball holding portion at a front end of the tip and releases the intimate contact when writing is performed.

Preferably, the valve chamber includes a groove on one side thereof through which the ink flows in an axial direction of the ball-point pen and a conduit formed to be eccentric from an axis of the inside hollow of the joint, and the ball valve contacts in an eccentric state the rear end of the tip to form an ink flow path. Alternatively, the valve chamber has a predetermined number of projecting ribs on a circumferential wall in a front portion thereof and a ball valve fitted in the valve chamber by elastic deformation of the projecting ribs, the ball valve contacts the projecting ribs to form ink flow channels between the projecting ribs.

The spring consists of a pressing member having a straight rod portion for urging the tip ball and a coil spring.

As still another embodiment of the ball-point pen for low-viscosity aqueous ink of the present invention, the following aspect can be added to the first or second invention described above. That is, disclosed is a ball-point pen for low-viscosity aqueous ink in which the ball-point pen refill is inserted into a barrel cylinder, always biased backward by a spring provided between a flange-like step portion formed on an outer circumferential surface of the joint and a step portion on an inner circumferential surface of the barrel cylinder, and axially moved with respect to the barrel cylinder, thereby allowing the front end portion of the tip to extend and retract through a front end opening of the barrel cylinder.

DESCRIPTION OF THE PREFERRED EMBODIMENTS

Figure 1:
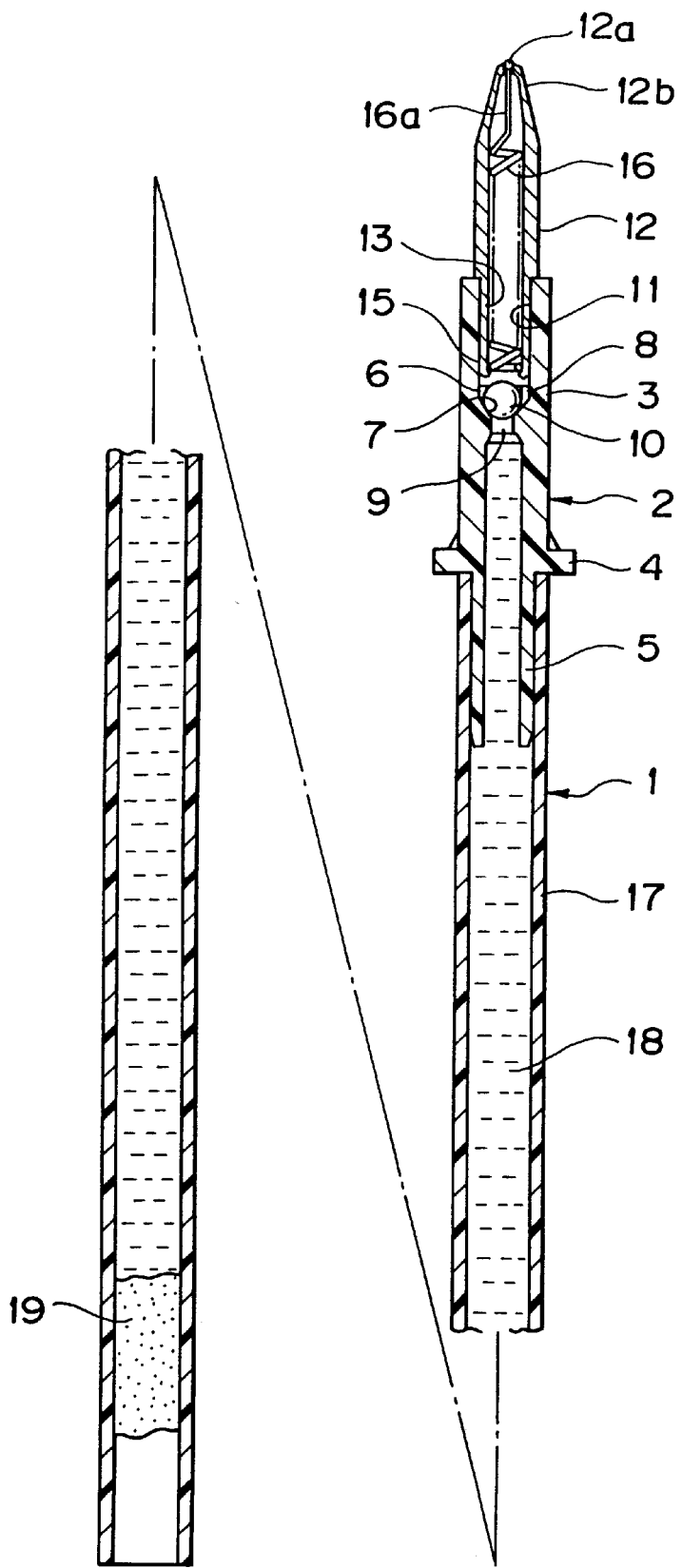
FIG. 1 is a vertical sectional view showing an overall feature of a ball-point pen refill with its tip pointed upward according to the first embodiment.

A solvent of ink of the present invention is at least one material selected from the group consisting of ethyleneglycol, diethyleneglycol, propyleneglycol, and glycerin. This solvent serves as a humectant and effectively prevents vaporization of water and dry-up of a writing tip.

The content of the solvent in ink is 5 to 40 wt %, preferably 20 to 30 wt %. Although the above materials can be used singly and two or more types of them can also be combined, ethyleneglycol has the highest moisture retention.

A crosslinking acrylic acid polymer used in the ink of the present invention can impart an appropriate pseudoplasticity to the ink. Therefore, this crosslinking acrylic acid polymer can prevent a forward flow phenomenon and is stable with time. Also, the crosslinking acrylic acid polymer has a high moisture retention. The present invention can be realized by combining this polymer with the hygroscopic solvent described above.

The content of the crosslinking acrylic acid polymer in the ink is 0.1 to 1.0 wt %, preferably 0.2 to 0.5 wt %. If the content is smaller than 0.1 wt %, the pseudoplasticity for preventing a forward flow phenomenon is too weak. If the content is larger than 1.0 wt %, the pseudoplasticity becomes too strong, and the ink no longer flows out smoothly when a ball rotates.

Specific examples of the crosslinking acrylic acid polymer are "HIGHVISWAKO 104" and "HIGHVISWAKO 105" manufactured by Wako Pure Chemical Industries Ltd., "JUNRON PW110" and "JUNRON PW111" manufactured by Nippon Junyaku K.K., and "CARBOPOLE 941" and "CARBOPOLE 1342" manufactured by BF Goodrich Co.

Pigments for use in the ink of the present invention are not particularly limited, and so it is possible to use any of inorganic and organic pigments conventionally used in aqueous pigment ink compositions. Examples of the inorganic pigments are titanium oxide, carbon black, and metal powders. Examples of the organic pigments include an azo lake, an insoluble azo pigment, a chelate azo pigment, phthalocyanine pigment, perylene and perynone pigments, anthraquinone pigment, quinacridone pigment, a dye lake, a nitro pigment, and a nitroso pigment.

More specifically, it is possible to use Phthalocyanine Blue (C. I. 74160), Phthalocyanine Green (C. I. 74260), Hansa Yellow 3G (C. I. 11670), Dis-azo Yellow GR (C. I. 21100), Permanent Red 4R (C. I. 12335), Brilliant Carmine 6B (C. I. 15850), and Quinacridone Red (C. I. 46500).

These pigments can be used singly, and two or more types of them can also be combined. On the basis of the overall weight of ink, the content of the pigments is chosen from a range of 5 to 10 wt %, preferably 6 to 8 wt %. If the content of the pigments is smaller than 5 wt %, the writing density lowers. If the content exceeds 10 wt %, the ink becomes unstable with time.

A nonionic or anionic surfactant or a water-soluble polymer is used as a dispersant to be adsorbed on the surface of a pigment particle to disperse the pigment in water. A water-soluble polymer is preferably used. Examples of the nonionic surfactant are polyoxyalkylene higher fatty acid esters, higher fatty partial esters of polyvalent alcohols, and higher fatty acid esters of sugars. Specific examples are glycerin fatty acid ester, polyglycerin fatty acid ester, propyleneglycol fatty acid ester, pentaerythritol fatty acid ester, polyoxyethylenesorbitan fatty acid ester, polyoxyethylenesorbitol fatty acid ester, polyoxyethyleneglycerin fatty acid ester, polyethyleneglycol fatty acid ester, polyoxytethylenealkylelether, polyoxyethylenephytosterol, polyoxytethylenepolyoxypropylenealkylether, polyoxyethylenealkylphenylether, polyoxyethylene castor oil, polyoxyethylenelanolin, polyoxyethylenelanolinalcohol, polyoxyethylenealkylamine, polyoxyethylene fatty acid amide, and a polyoxyethylenealkylphenylformaldehyde condensate.

Examples of the anionic surfactant are alkylated sulfonates of higher fatty acid amides and alkylallylsulfonate. Specific examples are alkylsulfate, polyoxyethylenealkylethersulfate, N-acylamino acid salt, N-acylmethyltaurine salt, polyoxyethylenealkyletheracetate alkylphosphate, and polyoxyethylenealkyletherphosphate.

Examples of the water-soluble polymer are polyacrylic acid, an acrylic acid copolymer, and a maleic acid resin.

More specifically, a resin such as an acrylic resin, a styrene-acrylic acid resin, or a styrene-maleic anhydride resin is converted into the form of a salt and made water-soluble. Representative examples of an alkali metal for forming the salt are sodium and potassium. Representative examples of the amine are aliphatic primary to tertiary amines such as mono-, di-, and tri-methylamine, mono-, di-, and tri-propanolamines, alcoholamines such as methylethanolamine, methylpropanolamine, and dimethylethanolamine, ammonia, morpholine, and N-methylpholine.

The content is 1 to 2 wt % in ink and approximately 20 wt % with respect to pigments.

It is also possible to use a lubricant, a rust preventive, a preservative, a pigment dispersant, and a pH regulator where necessary.

To enhance the moisture retention, it is possible to use urine, surfactants of some kinds, and alcohols such as sorbitol and multitol as additives.

A method of manufacturing the ink of the present invention consists of the following three steps.

1. Preparation of pigment dispersion (toner):
Pigments, dispersants, solvents, additives, and water are well dispersed by using a dispersing machine such as a bead mill or a ball mill. A coarse dispersion is removed by centrifugal separation, thereby obtaining toner.

2. Preparation of pseudoplasticity imparting agent base (gel base):
A pseudoplasticity imparting agent is gradually added to a predetermined amount of water and completely dissolved in water under stirring. A base such as monoethanolamine or triethanolamine is added to adjust the pH of the solution to 6 to 9, thereby obtaining a gel base.

3. Preparation of ink:
The gel base and a solvent are weighed and well mixed using a stirrer.

The toner is added to the mixture, and stirring is further performed until the gel product is uniformly dissolved. Impurities are removed through a filter, thereby obtaining ink.

The ink of the present invention can be used by directly filling it in an ink reservoir without using any ink absorber body. The ink has effects of preventing evaporation of water from the writing tip, retaining moisture of the writing tip, and preventing a forward flow phenomenon. That is, the ink of the present invention suppresses evaporation of water from the writing tip, since the hygroscopicity and the moisture retention of at least one of a solvent selected from the group consisting of ethyleneglycol, diethyleneglycol, propyleneglycol, and glycerin are combined with a high moisture retention of the crosslinking acrylic acid polymer. For this reason, even if the pen is left unused with no cap on it for long periods of time, the ink neither dries nor solidifies. Consequently, a ball-point pen with a smooth beginning of writing (initial writing property) can be obtained.

The pigments used in the ink of the present invention are insoluble in water and solvents, and so a solid component of the pigments gives rise to a slight clogging in the writing tip.

Also, the pigment dispersion itself has pseudoplasticity. It is assumed that the combination of this pseudoplasticity and the pseudoplasticity imparting effect of the crosslinking acrylic acid polymer perfectly prevents a forward flow phenomenon. More specifically, the crosslinking acrylic acid polymer achieves the two effects, i.e., prevents a forward flow and serves as a humectant which minimizes evaporation of water from the writing tip. The pigments give writing traces of the ink resistances to light, water, and solvents much higher than those of dye ink. The pigments are also excellent in so-called display properties with which red ink, blue ink, and some other color ink are clearly seen in their respective colors.

When the ink of the present invention is contained in a ball-point pen, a flow of the ink is prevented by a high viscosity of several thousand mPa·S while the pen is not used in writing, i.e., is in a static state in which no shearing force is applied. When writing is started and a shearing force is produced by rotation of the ball, the viscosity lowers to allow the ink to flow out, making writing possible.

The structure and the function of the ball-point pen for low-viscosity aqueous ink of the present invention are as described above. When the specific low-viscosity aqueous ink of the present invention is used, it is possible to provide, e.g., a knocking type ball-point pen which can draw dense and even lines free from blotting and in which the writing tip requiring no cap can be freely extended and retracted.

Additionally, since the writing tip has a high moisture retention, the pen can be left unused with no cap on it and is highly stable with time. It is possible to prevent a forward flow of ink which occurs when low-viscosity ink is used and a backward flow of ink taking place in upward writing or knocking or upon application of impacts. This prevents pollution in the barrel or the user's hands and clothes. Unclear writing traces also are prevented. Furthermore, the tip ball is in intimate contact with the inner edge of the tip holding portion except when the pen is used in writing. Accordingly, no unclear writing traces occur due to drying even if the pen is left unused for long time periods.

EXAMPLES

The present invention will be described in more detail below by way of its examples.

The ink obtained in each example was evaluated by the following methods.

As a ball-point pen used in the tests, a barrel of a knocking type of ball-point pen SN-80 manufactured by Mitsubishi Pencil Co., Ltd. was used. The ink obtained in each example and comparative example was filled in a refill consisting of a polypropylene ink reservoir 3 mm in inner diameter and 100 mm in length and a stainless steel tip (the ball was made of a hard metal and had a diameter of 0.5 mm). Note that a follower used in a ball-point pen UM-100 (using a medium-viscosity aqueous ink) manufactured by Mitsubishi Pencil Co., Ltd. was filled in the rear end of the ink.

1) Initial writing property

Writing was done by free hand, and the initial writing property was evaluated by the following standards.

○ no problem

Δ slightly blurred

2) Forward flow preventing property

Ten ball-point pens filled with predetermined ink were left to stand with their writing tips pointed down in an air-conditioned bath at a temperature of 25° C. and a humidity of 65% for one week. The degree of a forward flow phenomenon was evaluated by the following standards.

○ none

Δ a little

▲ slightly large x very large

3) Initial writing property with time

Ten ball-point pens were left to stand in each of constant-temperature baths at 25° C. and 40° C. for six months. Writing was done by free hand by using these pens, and the initial writing property was evaluated by the following standards.

○ lines can be drawn with no problem from the beginning of writing

Δ slightly blurred in the beginning of writing, but the performance is immediately restored to enable writing ▲ extra writing is necessary before lines can be normally drawn x very blurred and no initial lines can be drawn 4) Loss of weight In the evaluation of the initial writing property, the loss of weight (%) of ink was also measured by assuming that the weight of ink initially filled was 100.

The ink of the present invention will be described below by Examples 1 to 9 and Comparative Examples 1 to 3.

Examples 1–9

Aqueous ink components for a ball-point pen of a direct reservation type were manufactured in accordance with the manufacturing method described above by using Carbon Black "MCF-88" [available from Mitsubishi Kasei Corp.], a red pigment "FUJIRED 2510" [available from Fuji Shikiso K.K.], and a blue pigment "RIONOL BLUE EFW" [available from TOYO INK MFG. CO., LTD.], as pigments; a styrene-acrylic resin as a dispersant; ethyleneglycol (EG), diethyleneglycol (DEG), propyleneglycol (PG), and glycerin (G) as solvents; a crosslinking acrylic acid polymer "HIGHVISWAKO 104" [available from Wako Pure Chemical Industries Ltd.] as a pseudoplasticity imparting agent; a phosphoric ester "RM-510" [available from TOHO CHEMICAL INDUSTRY CO., LTD.] as a lubricant; benzotriazole "NEYANOX BTL" [available from Orient Kagaku Kogyo K.K.] as a preservative and a rust preventive; triethanolamine as a pH regulator; and ion exchange water. The mixing ratios and evaluations are shown in Table 1.

Comparative Examples 1–3

As comparative examples, Table 1 also shows cases where a black dye ["WATER BLACK 187LM" (manufactured by Orient Kagaku Kogyo K.K.] was used (Comparative Example 1), no solvent was used (Comparative Example 2), and an acryl-based copolymer ["PRIMAL TT-615" (manufactured by Rohm & Haas Co.)] was used (Comparative Example 3).

TABLE 1

|  |  | EXAMPLES | | | | | | | | | COMPARATIVE EXAMPLES | | |
| --- | --- | --- | --- | --- | --- | --- | --- | --- | --- | --- | --- | --- | --- |
|  |  | 1 | 2 | 3 | 4 | 5 | 6 | 7 | 8 | 9 | 1 | 2 | 3 |
| Ink composition (wt %) | Carbon black | 8 | 8 | 8 |  |  |  |  | 8 | 8 |  | 8 | 8 |
|  | Red pigment |  |  |  | 7 | 7 |  |  |  |  |  |  |  |
|  | Blue pigment |  |  |  |  |  | 7 | 7 |  |  |  |  |  |
|  | Black dye |  |  |  |  |  |  |  |  |  | 8 |  |  |
|  | Dispersant | 1.5 | 1.5 | 1.5 | 1.5 | 1.5 | 1.5 | 1.5 | 1.5 | 1.5 |  | 1.5 | 1.5 |
|  | EG | 25 | 13 | 13 | 25 |  |  |  | 25 | 25 | 25 |  | 25 |
|  | DEG |  |  | 13 |  |  |  | 25 |  |  |  |  |  |
|  | PG |  | 25 |  |  |  | 25 |  |  |  |  |  |  |
|  | G |  |  |  |  | 20 |  |  |  |  |  |  |  |
|  | Crosslinking acrylic acid polymer | 0.4 | 0.4 | 0.4 | 0.3 | 0.3 | 0.3 | 0.3 | 0.2 | 0.6 | 0.4 | 0.4 |  |
|  | Acryl-based copolymer |  |  |  |  |  |  |  |  |  |  |  | 0.4 |
|  | Lubricant | 1.0 | 1.0 | 1.0 | 1.0 | 1.0 | 1.0 | 1.0 | 1.0 | 1.0 | 1.0 | 1.0 | 1.0 |
|  | Preservative and rust preventive | 0.5 | 0.5 | 0.5 | 0.5 | 0.5 | 0.5 | 0.5 | 0.5 | 0.5 | 0.5 | 0.5 | 0.5 |
|  | pH regulator | 0.5 | 0.5 | 0.5 | 0.5 | 0.5 | 0.5 | 0.5 | 0.5 | 0.5 | 0.5 | 0.5 | 0.5 |
|  | Ion exchange water | 63.1 | 63.1 | 62.1 | 64.2 | 64.2 | 64.2 | 64.2 | 63.3 | 62.9 | 64.6 | 88.1 | 63.1 |
| Evaluations | Initial writing property | ○ | ○ | ○ | ○ | ○ | ○ | ○ | ○ | Δ | ○ | ○ | ○ |
|  | Forward flow preventing property | ○ | ○ | ○ | ○ | ○ | ○ | ○ | ▲ | ○ | x | ○ | ○ |
|  | Initial writing property with time (25° C.) | ○ | Δ | ○ | ○ | Δ | Δ | Δ | ○ | Δ | ○ | x | x |
|  | Loss of weight, % (25° C.) | 3 | 5 | 3 | 3 | 3.5 | 4.5 | 4 | 3 | 3 | 3 | 15 | 9 |
|  | Loss of weight, % (40° C.) | 6 | 11 | 6 | 6 | 7 | 10 | 9 | 6 | 6 | 6 | 23 | 18 |

A refill structure of the ball-point pen of the present invention will be described below.

Embodiment A

Figure 2:
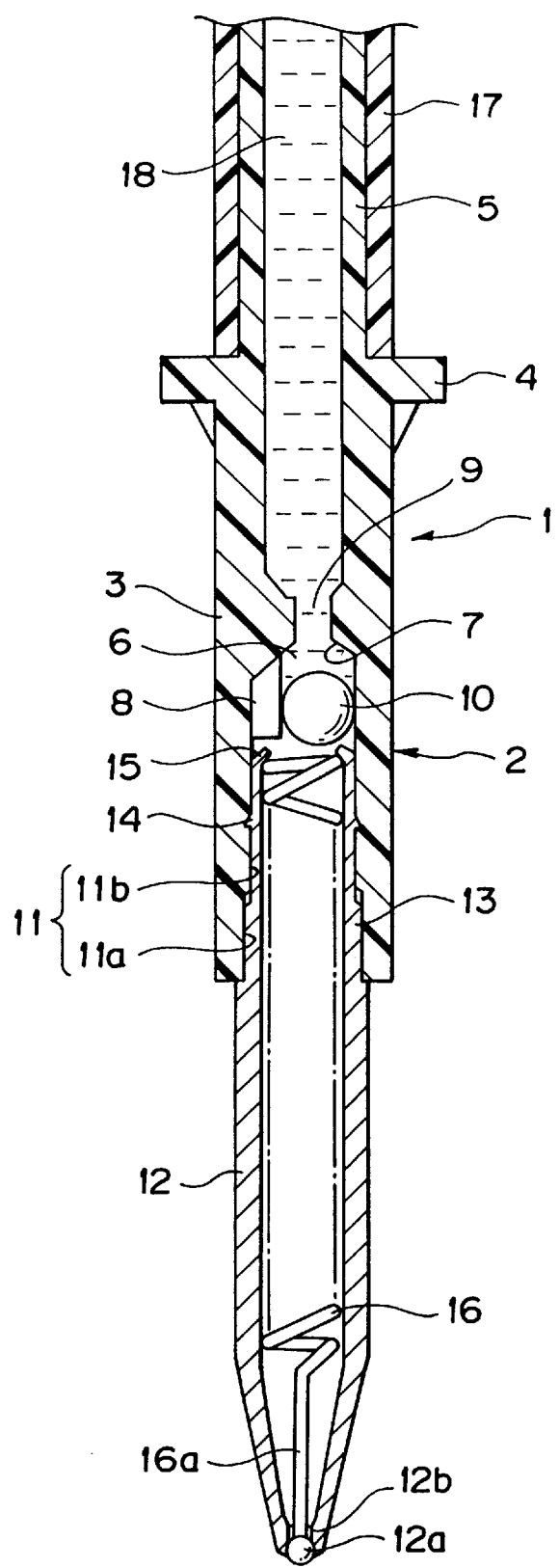
FIG. 2 is an enlarged sectional view showing the major components of the ball-point pen refill with its tip pointed downward according to the first embodiment.
Figure 3:
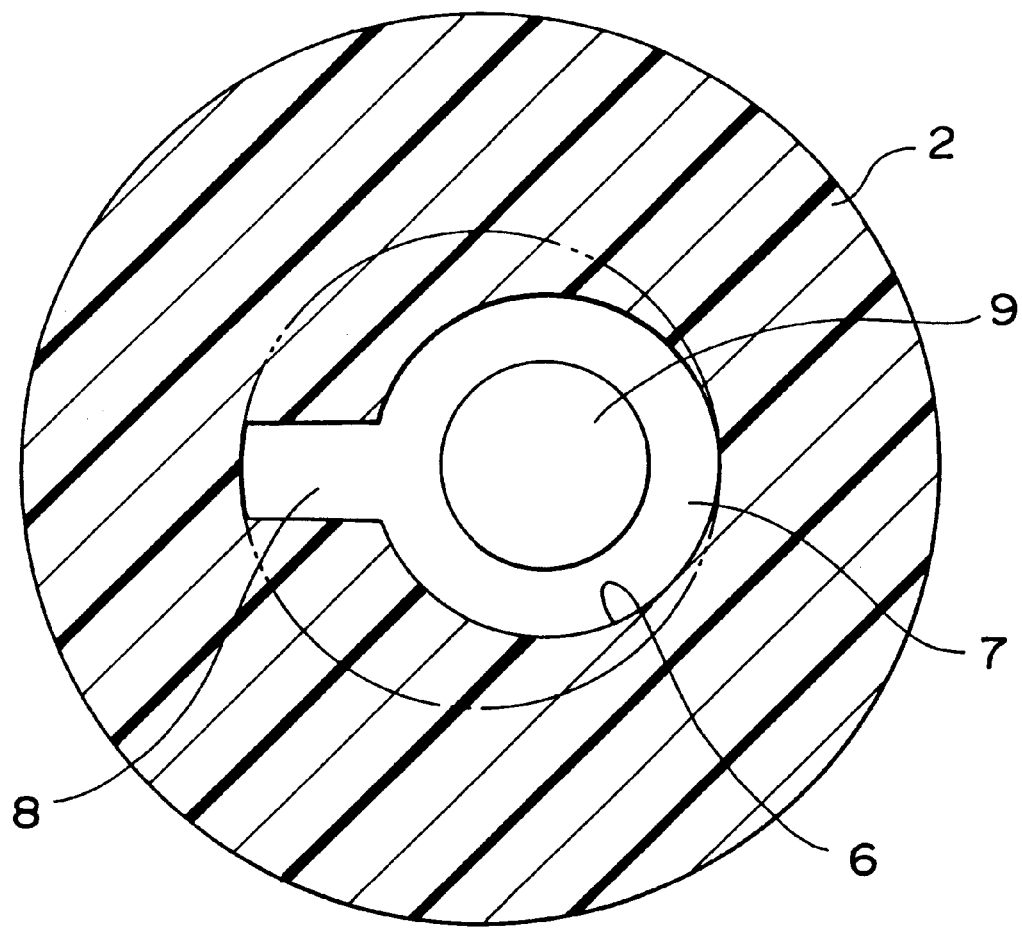
FIG. 3 is an enlarged transverse sectional view showing a valve chamber in the first embodiment.

FIGS. 1 to 3 illustrate a refill (in which a conduit is arranged eccentric, and which has a ball valve and a spring) of the second ball-point pen according to the present invention.

FIG. 1 shows a ball-point pen refill 1 in which an ink reservoir 17 containing ink 18 obtained in any of Examples 1 to 9 and a follower 19 filled in the rear end of the ink is attached to a tip 12 via a joint 2. FIG. 2 shows a front portion of the ball-point pen refill 1.

The joint 2 consists of a flange-like step portion 4 and front and rear pipe portions 3 and 5 before and after the step portion 4. A pipe portion 13 of the tip 12 holding a tip ball 12a is fixed in an inside hollow 11 in the front end of the front pipe portion 3.

The inside hollow 11 consists of front and rear tip fitting hollow sections 11a and 11b. A projected engaging portion 14 is formed, where necessary, on the outer circumferential surface of the pipe portion 13 of the tip 12 and engages with the tip fitting hollow section 11b by biting into it.

The tip 12 is so caulked that the tip ball 12a is rotatably held as it is substantially in contact with a seat having a channel 12b through which the ink can flow. A spring 16 is inserted into the inside hollow of the tip 12, and the rear end (15) of the pipe portion 13 of the tip is properly caulked so that the rear end of the spring 16 cannot be pulled out. Intimate contact of the tip ball 12a with the inner surface of the tip holding portion is very important in preventing a forward flow of the ink. This is accomplished by taking account of the surface roughness of the inner surface of the tip for holding the tip ball, polishing of the inner surface for improving the contact accuracy by caulking, and the secondary plastic processing for improving the caulking accuracy. Also, a surface treatment is performed for the surface to be brought into contact with the tip ball.

A front portion of the spring 16 is a straight rod portion 16a, and the front end of the rod portion 16a abuts against and presses the rear end of the tip ball 12a. By this pressure, the tip ball 12a is kept in intimate contact with the inner edge of the ball holding portion (formed by, e.g., caulking) of the tip 12.

A valve chamber 6 in which a ball valve 10 is loosely fitted is formed in a rear portion of the inside hollow 11 of the joint. The rear portion of the valve chamber 6 communicates with the ink reservoir through a tapered or spherical ball valve seat 7 and a conduit 9 which is properly eccentric from the axis. A groove 8 is formed on one side of the inner wall of the valve chamber 6 so that the ink flows in the axial direction. When the tip 12 is pointed down, the ball valve 10 loosely fitted in the valve chamber 6 contacts in an eccentric state the rear end of the pipe portion 13 of the tip and forms an ink flow path. The ink in the ink reservoir passes through the conduit 9 and flows into the tip inside hollow through the groove 8 and the ink flow path. When the tip is pointed up, the ball valve 10 abuts against the ball valve seat 7 and prevents a backward flow of the ink.

The tubular ink reservoir 17 is fixed under pressure on the outer circumferential surface of the rear pipe portion 5 extending backward from the step portion 4 of the joint 2, such that the front end of the ink reservoir 17 abuts against the rear end of the step portion 4. An inner-diameter portion of the ink reservoir 17 communicates with the conduit 9 of the joint 2. The ink 18 is filled in the ink reservoir 17, and the follower 19 capable of moving in contact with the ink surface as the ink is consumed is filled in the rear end of the ink 18. Note that a transparent polypropylene molded product, for example, is used as the ink reservoir 17. Note also that the inner surface of the ink reservoir 17 is coated with, e.g., silicone to obtain a clear draining property. Alternatively, a material having a good clear draining property is chosen for the ink reservoir. The ink reservoir 17 can also be formed integrally with the joint 2.

Figure 4:
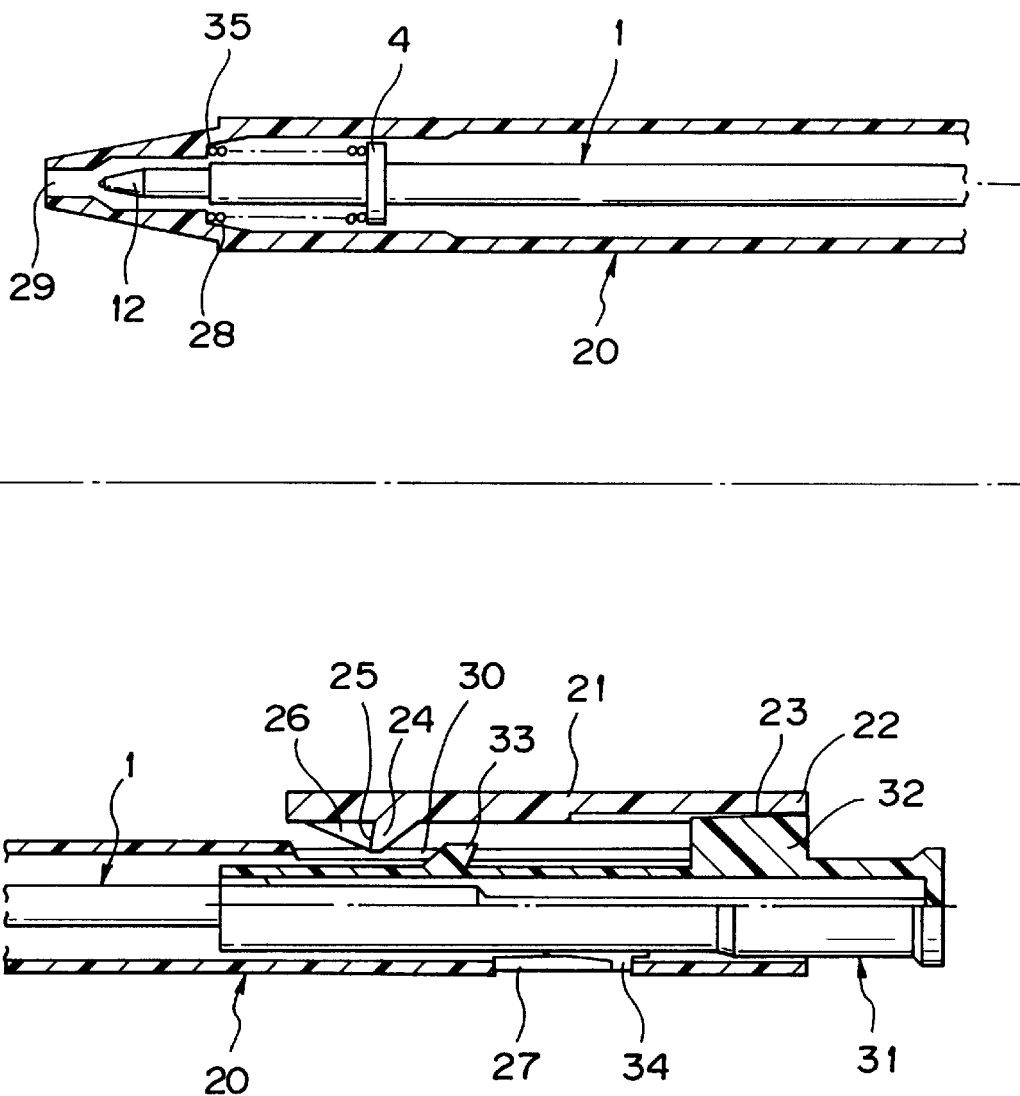
FIG. 4 is a partially uncut vertical sectional view showing an example of a knocking type ball-point pen incorporating the ball-point pen refill of this embodiment with its writing tip retracted.
Figure 5:
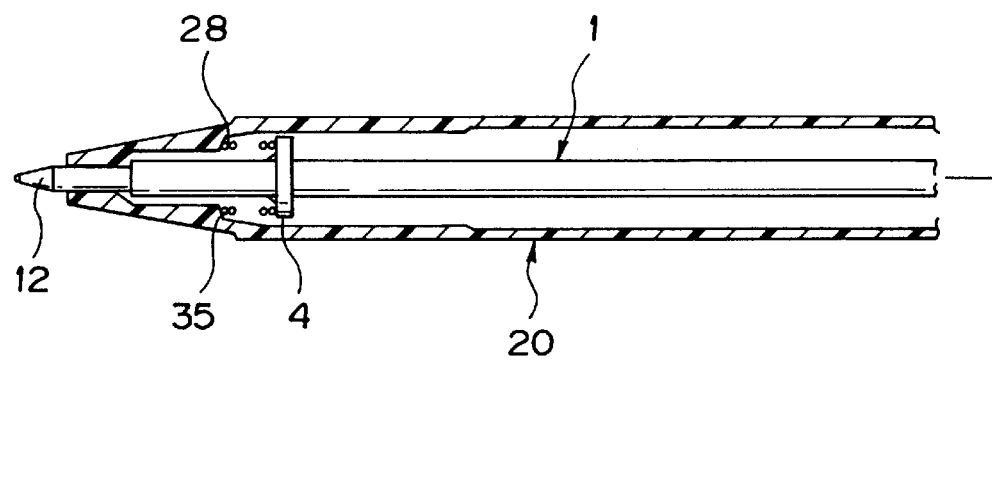
FIG. 5 is a partially uncut vertical sectional view corresponding to FIG. 4, in which the writing tip is projected.
Figure 5:
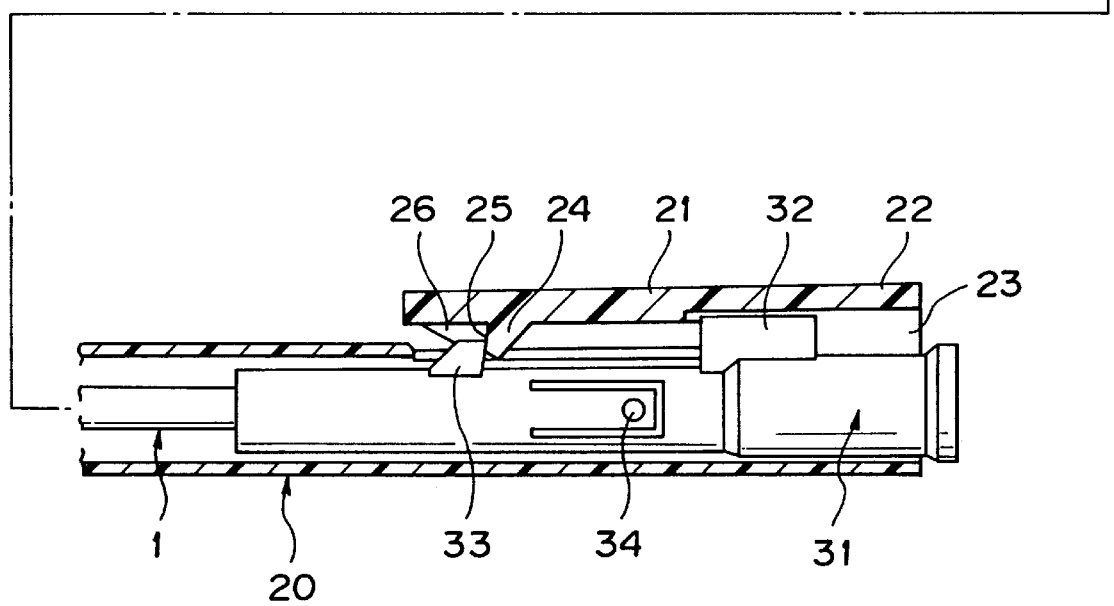
Figure 6:
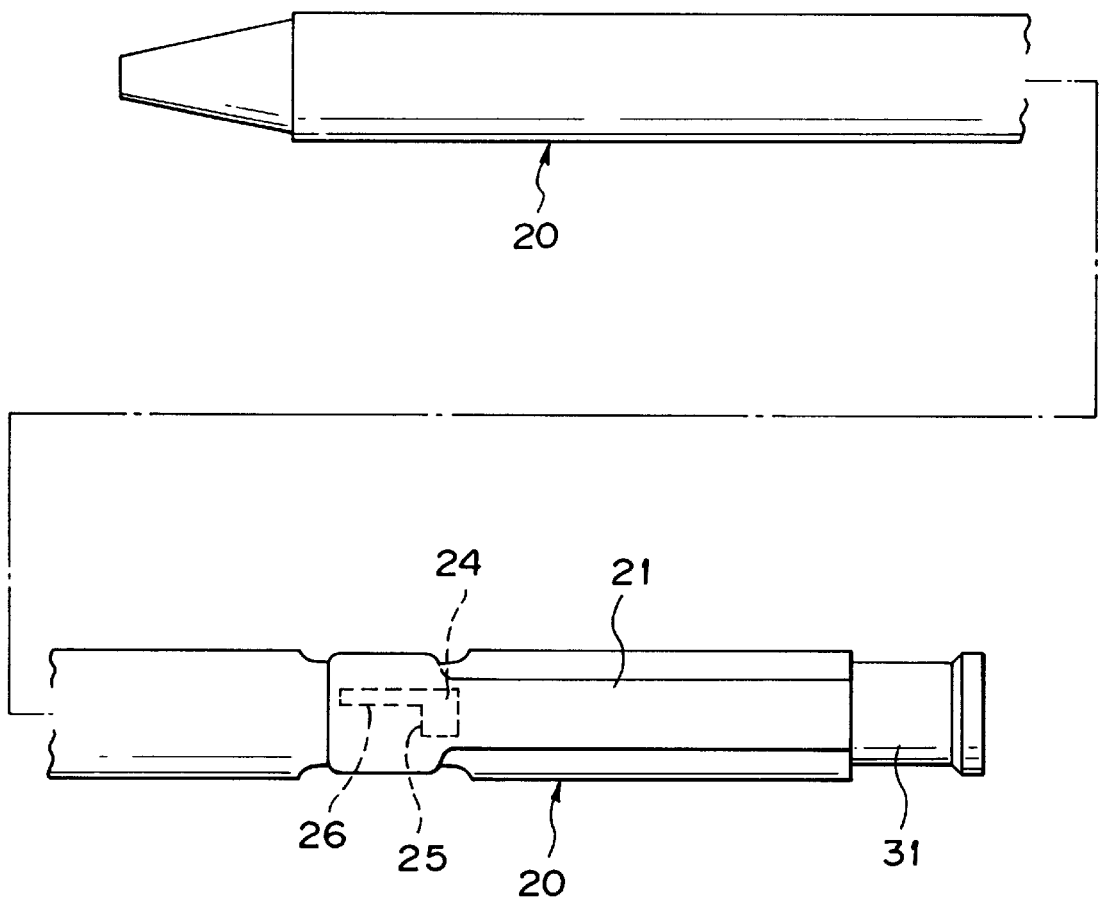
FIG. 6 is a top view corresponding to FIG. 4.

FIGS. 4 to 6 illustrate a knocking type ball-point pen as an example of the ball-point pen of the present invention. Since this ball-point pen is basically identical with the knocking type writing tool described in Japanese Utility Model Publication Hei 4 No.53987, only the main points and the differences will be described below.

A barrel cylinder 20 has a slit 30 in a portion of the surface opposing a clip 21 and is formed integrally with the clip 21. The clip 21 has an attachment leg 22 including grooves 23 which connect with the two sides of the slit 30 and communicate with the slit 30. A bead 24 is formed in the front end portion of the clip 21. The bead 24 has a hook-shaped catching step 25 and a side wall 26. The clip 21 can be elastically displaced laterally by a distance by which an engaging projection 33 of a knock member 31 (to be described later) and the catching step 25 can be disengaged. A window hole 27 is formed in the surface of the barrel cylinder 20 in addition to the slit 30. The barrel cylinder 20 is made by integrating all these parts from a transparent resin containing polyester.

The knock member 31 has the engaging projection 33 on the circumferential surface, a stopper piece 32 formed coaxially with the engaging projection 33, and a elastically displaceable engaging projection 34 formed on an axis different from the axis of the engaging projection 33.

The ball-point pen refill 1 is inserted into the inside hollow of the barrel cylinder 20 with the rear end of a coil spring 35 abutted against the step portion 4. While the front end of the coil spring 35 is abutted against an inside step portion 28 of the barrel cylinder, the knock member 31 is attached from the rear end of the barrel cylinder 20 so as to accommodate the rear portion of the ball-point pen refill 1. The engaging projection 33 of the knock member 31 protrudes into the slit 30 through the grooves 23 of the stopper piece 32. The stopper piece 32 is positioned in the grooves 23 in the attachment leg 22. At the same time, the engaging projection 34 protrudes from the rear end portion of the window hole 27 in the barrel cylinder. Consequently, the knock member 31 is urged rearward and prevented from being removed.

Embodiment B

Figure 7:
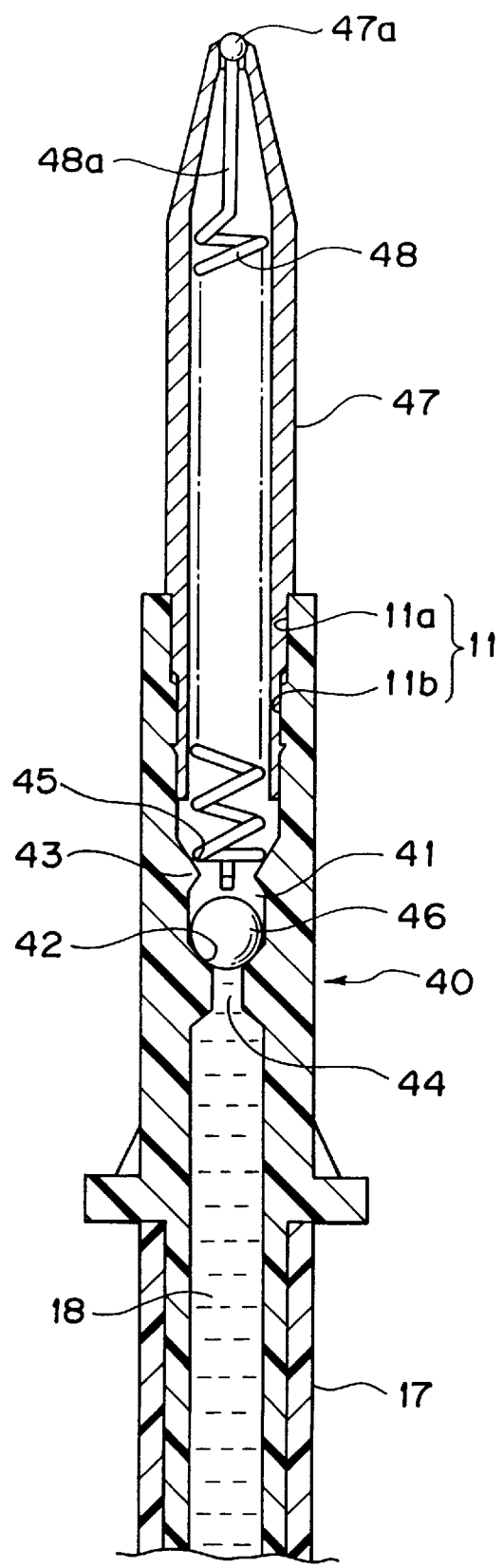
FIG. 7 is an enlarged sectional view showing the main parts of a ball-point pen refill with its tip directed upward according to the second embodiment.

FIG. 7 shows a refill (which has projecting ribs in a front portion of a valve chamber and also has a ball valve and a spring having a rod shaft) of the second ball-point pen of the present invention.

Only the differences from Embodiment A will be described below. A joint 40 is integrally molded with an elastically deformable synthetic resin. A valve chamber 41 is formed in a rear portion of the joint 40 and communicates with tip fitting hollow sections 11a and 11b. A tapered or spherical ball valve seat 42 is formed in a rear portion of the valve chamber 41. A predetermined number of projecting ribs 43 are formed in the circumferential wall of a front portion of the valve chamber 41.

A conduit 44 communicating with the ball valve seat 42 is formed in the rear portion of the valve chamber 41. A ball valve 46 is inserted and fitted in the valve chamber 41 by elastically deforming the projecting ribs 43. Note that ink introducing channels are formed between the projecting ribs against which the ball valve 46 abuts. The rear end of a spring 48 abuts against step portions 45 at the front edges of the projecting ribs 43, and the front end of a rod shaft 48a presses the rear end of a tip ball 47a.

In the above construction, when a tip 47 is pointed down the ball valve 46 abuts against the rear edges of the projecting ribs 43 to allow ink 18 to flow to the rear end of the tip ball 47a through the conduit 44, the valve chamber 41, the ink introducing channels between the projecting ribs, and the inside hollow of the tip 47.

Embodiment C

Figure 8:
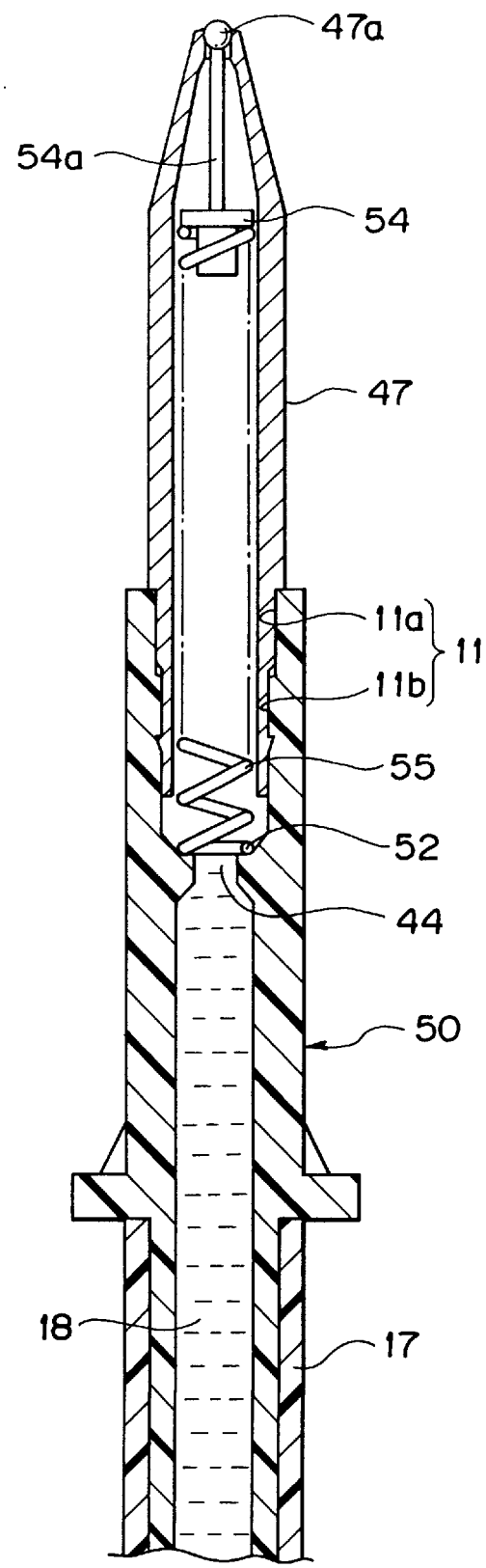
FIG. 8 is an enlarged sectional view showing the major parts of a ball-point pen refill with its tip directed upward according to the third embodiment.

FIG. 8 shows a refill (which has a spring having a pressing member and a coil spring in its front portion) of the first ball-point pen of the present invention.

Since this embodiment is basically the same as Embodiment A, only the difference will be described below.

The front end of a coil spring 55 inserted into a tip 47 forms a seat, and a pressing member 54 having a straight rod 54a is disposed in front of the seat. The front end of the rod 54a presses a tip ball 47a. A step portion 52 for receiving the coil spring 55 is formed in a joint 50.

Embodiment D

Figure 9:
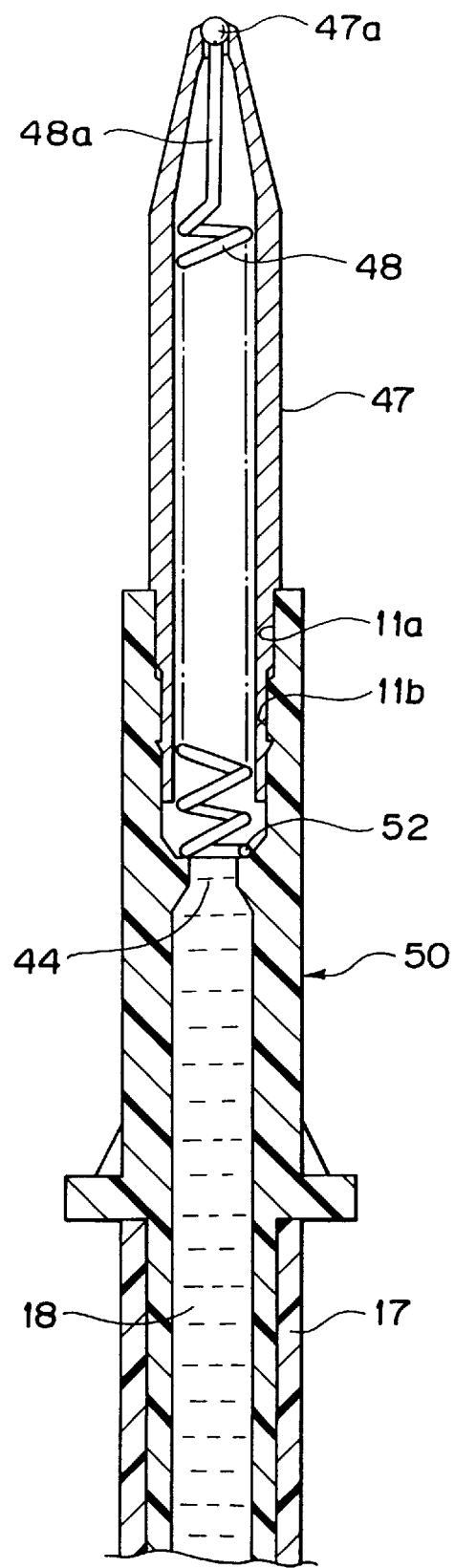
FIG. 9 is an enlarged sectional view showing the major components of a ball-point pen refill with its tip pointed up according to the fourth embodiment.

FIG. 9 shows a refill (which has spring having a rod portion in its front portion) of the first ball-point pen of the present invention.

Since this embodiment is basically the same as Embodiment A, only the difference will be described below.

A straight rod portion 48a is formed from the front end of a spring 48. The spring 48 also can have a tapered winding wire portion along a tapered inside hollow in a front portion of a tip 47. Alternatively, since the inside hollow in the tip is generally formed by drilling a stepped hollow, the spring can be so formed as to have a stepped winding wire portion whose diameter is reduced along the stepped hollow. Furthermore, the front end of the winding wire portion is in some cases abutted against a tip ball.

The functions and effects of the ball-point pens of Embodiments A to D will be described in more detail below.

In Embodiment A, FIG. 1 shows the state in which the tip 12 is pointed up. In this state the ball valve 10 positions in the ball valve seat 7 in the valve chamber 6 and hermetically closes the conduit 9. Therefore, even when writing is performed with the pen pointed up and the ink immediately below the tip ball 12a in the tip is used up, the ink does not flow backward because of the head. Accordingly, when the tip 12 is pointed down the ink can immediately flow out to prevent blurred traces in writing. (In a structure having no ball valve, ink flows backward when writing is performed with the tip pointed up, and consequently air enters the tip. Therefore, in downward writing the ink cannot immediately flow to cause blurred writing traces.)

As in FIG. 2, when writing is done with the tip 12 pointed down, the ball valve 10 abuts in an eccentric state against one side of the rear end of the caulked portion 15 in the tip. In the other side the groove 8 through which the ink can flow into the tip 12 is formed. The ink 18 flowing from the ink reservoir 17 into the valve chamber 6 through the conduit 9 passes through the groove 8 and is introduced to the rear end of the tip ball 12a in the tip 12.

In this state, the tip ball 12a is brought into tight contact with the inner edge of the tip holding portion by the pressure of the rod portion 16a, and this prevents a forward flow of the ink. Also, since the tip ball 12a is slightly moved back by the writing pressure, a gap is formed to allow an outflow of the ink. A large amount of the ink flows out as the tip ball 12a rotates during writing, and this makes writing with a high writing density free from blotting possible.

The channel 12b (a tip ball valve seat having a plurality of ink flow grooves extending toward the tip inside hollow) is formed immediately below the tip ball 12a. The rod portion 16a extends through the central hole in the channel 12b. The ink in the tip is introduced to a portion immediately below the tip ball 12a through the ink flow grooves and the gap between the central hole and the rod portion 16a.

In Embodiment B, FIG. 7 shows the state in which the tip 47 is pointed up. In this state the ball valve 46 closely contacts the ball valve seat 42 in the valve chamber 41 and hermetically closes the conduit 44. Therefore, the ink does not flow backward even when the ink immediately below the tip ball 47a is used up during upward writing. When the tip 47 is pointed down, the ball valve 46 abuts against the rear edges of the projecting ribs 43 and opens the conduit 44. The ink flowing from the ink reservoir 17 into the valve chamber 41 through the conduit 44 passes through the ink introducing channels formed between the projecting ribs and is introduced to the rear end of the tip ball 47a. The rest of the function is the same as in the embodiment illustrated in FIG. 1.

Embodiment A has no projecting ribs which, as used in Embodiment B, abut against the ball valve to thereby prevent removal of the ball valve. Consequently, the mold accuracy and molding conditions in molding the joint 2 are eased. (It is difficult to obtain a high dimensional accuracy since projecting ribs are undercut upon mold release.) Using no projecting ribs also facilitates fitting the ball valve in the valve chamber. Accordingly, Embodiment A is advantageous in machine-assembly (in which projecting ribs are damaged because the ball valve is fitted by using elastic deformation of the projecting ribs).

On the other hand, in the Embodiment A, the rear edge of the tip 12 must be caulked or press-formed so as to prevent the spring 16 from falling out. Therefore, the Embodiment A is less advantageous than the Embodiment B because this forming process requires more time and labor.

Embodiments C and D are basically identical with Embodiment A, so only the main points will be described below.

In Embodiment C as illustrated in FIG. 8, the separate pressing member 54 is provided in the front end of the spring 55 to allow an easy rocking motion of the rod portion 54a. Accordingly, it is possible to select the frictional resistance (the material and shape) of the portion in contact with the tip ball 47a, resulting in a good touch of writing.

Embodiment D is advantageous in cost because, as shown in FIG. 9, the rod portion 48a is formed integrally with the winding wire portion of the spring 48. Also, since the tapered or stepped winding wire portion which reduces its diameter along the inside hollow of the tip 47 is formed, the rod portion is stable on the axis of the tip. This reduces an imbalance introduction of ink and stabilizes the contacting resistance against the tip ball.

Furthermore, since the tip ball 47a is always brought into intimate contact with the inner edge of the tip holding portion, the tip portion never dries and this prevents unclear traces of writing. There is the possibility that air enters and accumulates when writing is repetitively done with the tip pointed up. Therefore, Embodiment D is inferior to Embodiments A and B in this respect. However, the combined effect of the tip ball 47a and proper compositions of the ink and the ink follower used makes it possible to prevent the entrance of air even in upward writing or upon application of impacts. Consequently, a backward leak of the ink and unclear traces in writing can be prevented in practical use.

FIG. 4 illustrates the state in which the ball-point pen refill is accommodated in the barrel cylinder 20. When the knock member 31 is moved forward by knocking its rear end, the engaging projection 33 engages with the catching step 25. Consequently, as in FIG. 5, the front end of the tip 12 comes out from a barrel front end opening 29. When the distal end of the clip 21 is elastically displaced laterally from this state on the side where the side wall 26 exists, the engaging projection 33 disengages from the catching step 25 and returns to the position shown in FIG. 4. Also, when the clip 21 is put into a breast pocket or the like in the state shown in FIG. 5, the catching step 25 is pushed up and disengaged from the engaging projection 33, and the tip 12 retracts from the barrel front end opening 29 into the barrel cylinder. Accordingly, even if a user carelessly puts the pen into a pocket or the like with the tip of the pen projected, the pen does not pollute the user's clothes. In replacing the ball-point pen refill 1 with a new one, it is only necessary to push the engaging projection 34 of the knock member 31 to the inside. The engaging projection 34 is disengaged from the window hole 27 of the barrel cylinder, and the ball-point pen refill 1 can be removed together with the knock member 31.

Embodiment E

Embodiment E will be described below with reference to FIGS. 10 and 11.

Figure 10:
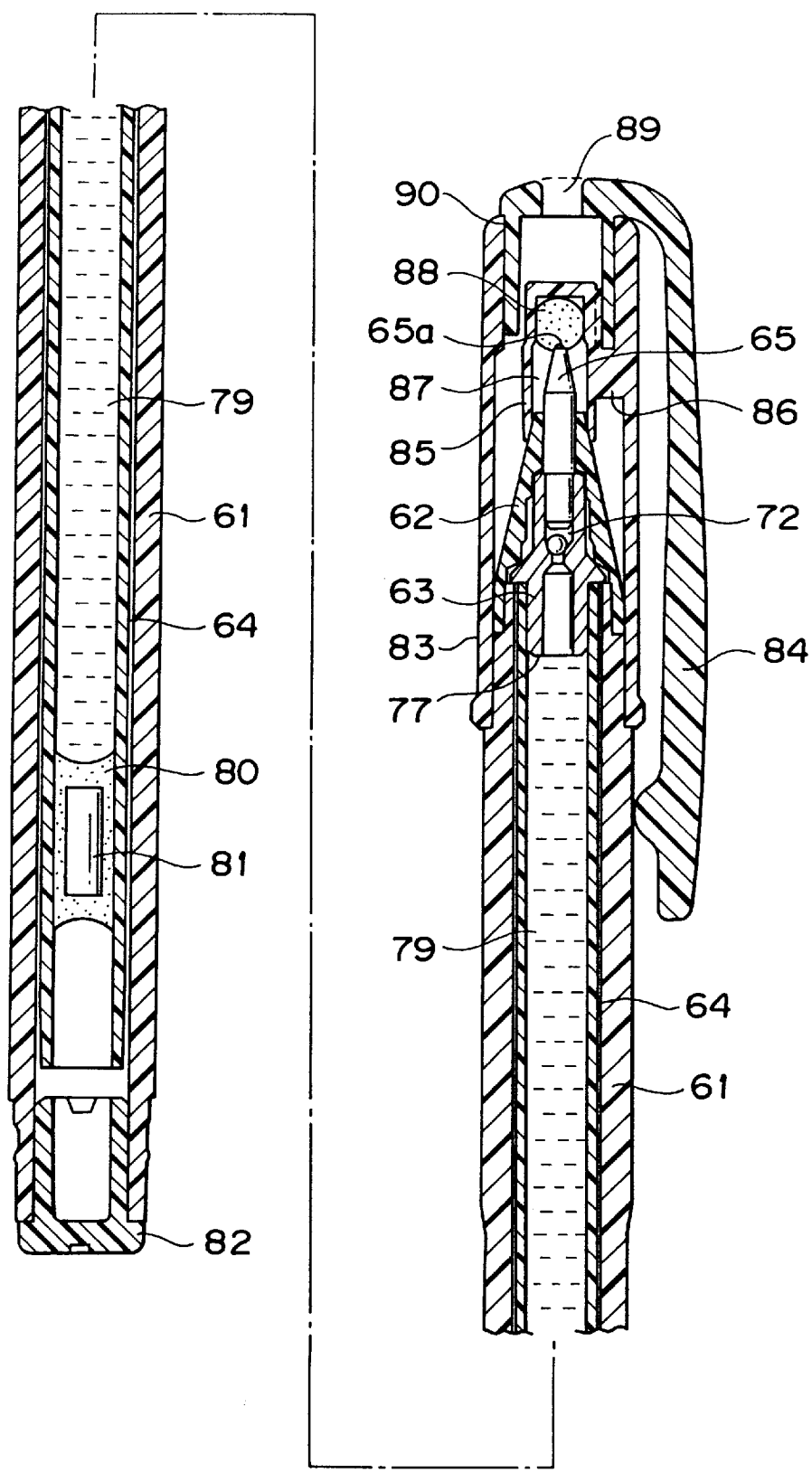
FIG. 10 is a vertical sectional view showing a ball-point pen according to the fifth embodiment.
Figure 11:
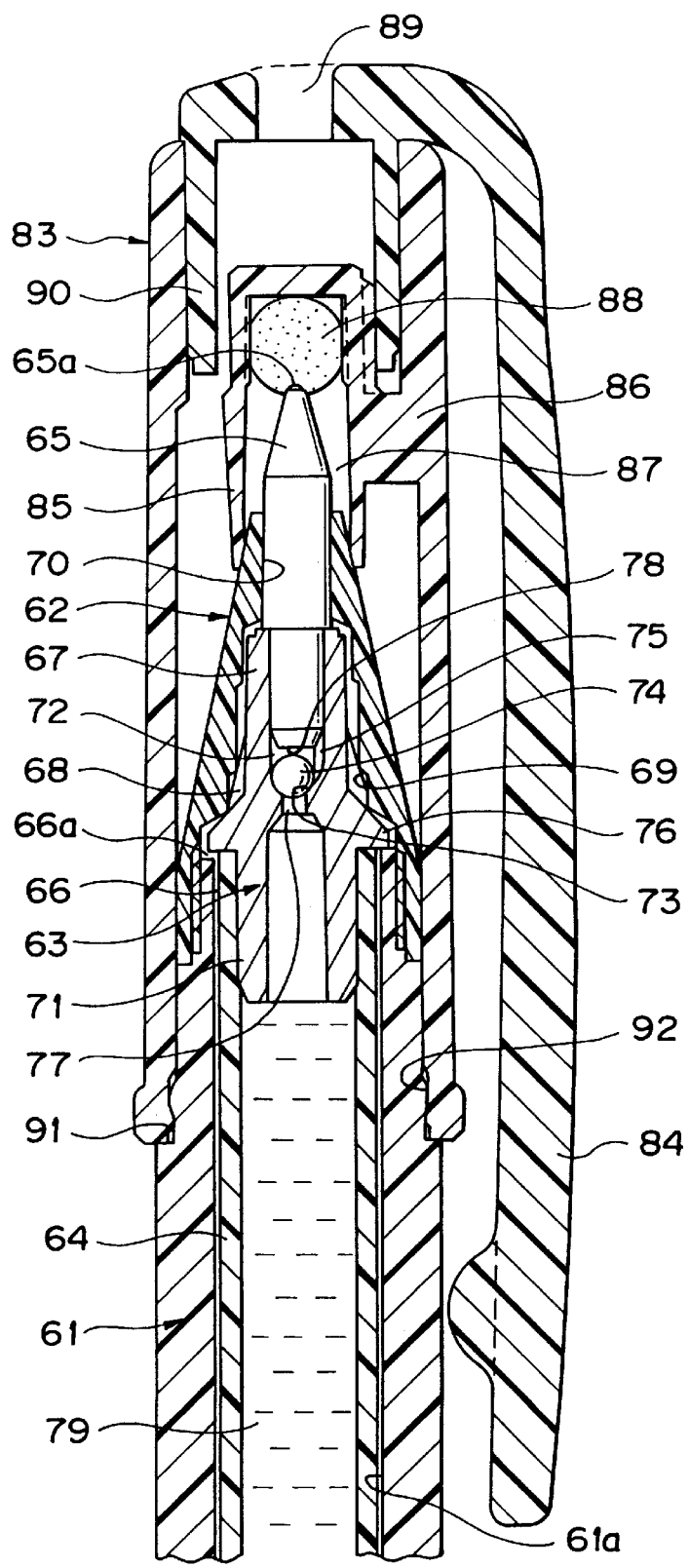
FIG. 11 is an enlarged view showing a front half portion of the ball-point pen in FIG. 10.

As shown FIGS. 10 and 11, a press cylindrical member 67 in which a linear or curved rib 68 is formed in a predetermined position is provided in the front half portion of a joint 63. A ring-like flange 76 is formed at the rear end of the rib 68. The rear end of the rib 68 is so connected as to form substantially the same shape as the outer shape of the flange 76.

A fitting cylindrical member 71 is formed in the rear half portion of the joint 63. An ink reservoir 64 is fixed in the fitting cylindrical member 71. The rear end of a tip 65 holding a tip ball 65a is pressed into a tip fitting hollow 70 in the front end of the press cylindrical member 67.

The joint 63 is formed by monolithic molding from a elastically deformable rigid resin. In the rear portion of the joint 63, a valve chamber 72 communicating with the tip fitting hollow 70 is formed. In the rear portion of the valve chamber 72, a conical ball valve seat 73 is formed. While the valve chamber 72 is fitted inside the tip fitting hollow 70, the axis of the hollow in the valve chamber 72 is properly eccentric from the axis of the tip fitting hollow 70. A groove 75 is formed on one side of the valve chamber hollow, and a ball valve 74 is loosely fitted in this valve chamber 72. A conduit 77 which communicates with the ball valve seat 73 is formed in the rear portion of the valve chamber 72. The valve chamber 72 need not be eccentric if the tip rear end hollow is eccentric from the tip fitting hollow 70.

The cylindrical ink reservoir 64 is pressed and fixed on the outer circumferential surface of the fitting cylindrical member 71 so that the front end of the ink reservoir 64 abuts against the flange 76. The inner-diameter portion of the ink reservoir 64 communicates with the conduit 77 of the joint 63. Low-viscosity aqueous ink 79 according to the present invention which is formed in any of Examples 1 to 9 is filled in the ink reservoir 64. Additionally, a transparent or opaque greasy follower 80 is filled in the rear end of the ink. This follower 80 prevents evaporation of the ink and also can move in contact with the ink surface as the ink is consumed. A resin member 81 having substantially the same specific gravity as the follower 80 is contained in the follower 80. This resin member 81 is made of, e.g., a polypropylene pipe member and embedded in the follower 80 such that the follower 80 is filled in both the inside and the outside of the pipe. Alternatively, the rear end of the pipe member properly protrudes from the rear end of the follower 80.

The material of the resin member 81 is not restricted to a pipe member, and so a rod member or a ball member also can be used. Any of these members having an outside diameter properly smaller than the inside diameter of the ink reservoir 64 is contained in the follower. Note that the ink reservoir 64 is made from a material, such as a transparent polypropylene molded product, which suppresses evaporation of the ink. The tip 65, the joint 63, and the ink reservoir 64 described above constitute a ball-point pen refill. The rear end of a barrel cylinder 61 is closed with a tail plug 82.

The refill in which the tip 65 and the ink reservoir 64 filled with the ink and the follower are fixed to the joint 63 is inserted from the front end of the barrel cylinder 61. The rear edge of the flange 76 of the joint 63 is abutted against the front surface of a pipe portion 66, and the outer periphery of the linear or curved rib 68 formed in a predetermined position of the press cylindrical member 67 is to abut against an inner step portion 69 of a mouthpiece 62 by biting into it. In this state the mouthpiece 62 is threadably engaged with the pipe portion 66 of the barrel cylinder 61. A notch 66a is formed in a predetermined position of the front end of the pipe portion 66, and the rear end of the flange 76 of the joint 63 abuts against the notch 66a. The barrel cylinder 61 is made of a transparent resin molded product so that the ink consumption amount can be seen. In the above structure, a vent path communicating with an inside hollow 61a of the barrel cylinder 61 is formed through a gap in a front end opening from which the tip 65 protrudes, a gap formed between the inner circumferential surface of the mouthpiece 62 and the rib 68 of the press cylindrical member 67, and the notch 66a in the pipe portion 66. Also, a vent hole for allowing the inside hollow 61a to communicate with the outside air is formed, if necessary, in the circumferential surface of the barrel cylinder 61 or between the tail plug 82 and the barrel cylinder.

A cap 83 fitted on the writing tip has a clip 84 positioned on its outer circumferential surface. A rear-end cylindrical member 90 is pressed into the rear end of the cap 83. A vent hole 89 is formed through the rear end of the cylindrical member 90. A cylindrical inner cap 85 having a small chamber 87 is formed in the rear portion of the inside hollow of the cap 83. This inner cap 85 is integrally formed by a predetermined number of ribs 86 formed between the inner cap 85 and the cap inside hollow portion. With this structure, a vent path communicating with the vent hole 89 is formed from the cap insertion hole through portions between the ribs. Note that various vent hole forming means are possible and so the structure is not particularly limited. An engaging portion 92 is formed in the insertion hole of the cap 83 and detachably engaged with an engaging portion 91 formed on the barrel cylinder 61. The engaging portion is a convex or concave portion which is often used in common ball-point pen structures. A seal plug 88 made from a non-liquid-absorbing, non-open-cell elastomer is fixed to the front end of the small chamber 87 of the inner cap 85. Consequently, the tip 65 and the front portion of the mouthpiece 62 are hermetically fitted by the small chamber 87, and the tip ball 65a is properly urged against the seal plug 88.

When the tip 65 is pointed up, as illustrated in FIG. 11, the ball valve 74 is in surface contact with the ball valve seat 73 and hermetically closes the conduit 77, preventing a backward flow of the ink during upward writing. FIGS. 10 and 11 illustrate the state in which the cap 83 is put on the writing tip. Since in this state the front end of the tip 65 is urged against the seal plug 88, the tip ball 65a does not come out by a falling impact. Also, the ball valve 74 is loosely fitted in the valve chamber 72 so as to be properly eccentric from a tip rear end hollow 78. In the manufacture of the refill, this prevents a bite of the ball valve upon centrifugal separation after the ink is filled. Therefore, even when the ball valve 74 abuts against the tip rear end hollow 78, the ball valve is eccentric to keep the portion through which the ink flows into the tip 65. Additionally, the colored resin member is contained in the follower 80 to clearly indicate the end of the ink. This resin member also enhances the internal friction even when the flow resistance of the follower lowers, thereby preventing a backward flow of the ink, and reduces the impact pressure on the tip ball 65a to prevent removal of the tip ball 65a even when the cap 83 is not put on the pen. Furthermore, since the inner cap is hermetically fitted, drying of the tip ball 65a and evaporation of the ink can be prevented. Also, the front end hollow of the mouthpiece 62 communicates with the inside hollow 61a of the barrel cylinder 61. This reduces an increase and a decrease in the pressure when the cap is put on and off, preventing cells from entering the ink. Moreover, even if an infant swallowed the cap by accident, breathing can be continued because the vent hole 89 is formed. Also, since the outer periphery of the rib 68 formed on the press cylindrical portion 67 of the joint 63 abuts against the inner step portion 69 of the mouthpiece 62 by biting into it, the tip 65 is fixed to the mouthpiece 62 without any play.

What is claimed is:

1. A ball-point pen for low-viscosity aqueous ink comprising:
    a ball-point pen refill in which an ink reservoir communicates with a tip ball via a joint;
    wherein:
        said ink reservoir is filled with an aqueous ink, said aqueous ink containing at least one of a solvent selected from the group consisting of ethyleneglycol, diethyleneglycol, propyleneglycol, and glycerin in an amount of 5 to 40 wt % of a total ink amount, a crosslinking acrylic acid polymer in an amount of 0.2 to 0.5 wt % of the total ink amount, a pigment in an amount of 5 to 10 wt % of the total ink amount, a water-soluble polymer in an amount of 1 to 2 wt % of the total ink amount, and the balance primarily consisting of water; and
        said tip has a spring which in a normal state urges and brings said tip ball into intimate contact with an inner edge of a ball holding portion at a front end of said tip and releases the intimate contact when writing is performed.

2. The ball-point pen for low-viscosity aqueous ink according to claim 1, wherein said aqueous ink contains said crosslinking acrylic acid polymer in an amount of 0.3 to 0.5 wt % of the total ink amount.

3. The ball-point pen for low-viscosity aqueous ink according to claim 1, wherein said spring has a straight rod portion in a front portion thereof.

4. The ball-point pen for low-viscosity aqueous ink according to claim 1, wherein said spring consists of a pressing member having a straight rod for urging said tip ball and a coil spring.

5. The ball-point pen for low-viscosity aqueous ink according to claim 1, wherein said ball-point pen refill is inserted into a barrel cylinder, always urged rearward by a spring provided between a flange-like step portion formed on an outer circumferential surface of said joint and a step portion on an inner circumferential surface of said barrel cylinder, and axially moved with respect to said barrel cylinder, thereby allowing the front end portion of said tip to extend and retract through a front end opening of said barrel cylinder.

6. A ball-point pen for low-viscosity aqueous ink comprising:
    a ball-point pen refill in which an ink reservoir communicates with a tip for holding a tip ball via a joint,
    wherein:
        said ink reservoir is filled with aqueous ink, said aqueous ink containing at least one type of a solvent selected from the group consisting of ethyleneglycol, diethyleneglycol, propyleneglycol, and glycerin in an amount 5 to 40 wt % of a total ink amount, a crosslinking acrylic acid polymer in an amount of 0.2 to 0.5 wt % of the total ink amount a pigment in an amount of 5 to 10 wt % of the total ink amount, a water soluble polymer in an amount of 1 to 2 wt % of the total ink amount, and the balance primarily consisting of water;

a follower comprising a greasy substance, which can move as ink is consumed during writing and has a property of preventing evaporation of ink, is filled in a rear end of said ink reservoir;

an inside hollow of said joint has a valve chamber in which a ball valve is loosely fitted;

a rear portion of said valve chamber has a ball valve seat which intimately contacts said ball valve and prevents a backward flow of said ink and a conduit which communicates with said ink reservoir from said ball valve seat;

a front portion of said valve chamber has a portion in contact with said ball valve and communicates with a rear end of said tip; and said tip has a spring which in a normal state urges and brings said tip ball into intimate contact with an inner edge of a ball holding portion at a front end of said tip and releases the intimate contact when writing is performed.

7. The ball-point pen for low-viscosity aqueous ink according to claim 6, wherein said valve chamber includes a groove on one side thereof through which said ink flows in an axial direction of said ball-point pen and a conduit formed to be eccentric from an axis of the inside hollow of said joint, and said ball valve contacts in an eccentric state the rear end of said tip to form an ink flow path.

8. The ball-point pen for low-viscosity aqueous ink according to claim 6, wherein said valve chamber has a plurality of projecting ribs on a circumferential wall in a front portion thereof and a ball valve fitted in said valve chamber by elastic deformation of said projecting ribs, said ball valve contacts said projecting ribs to form ink flow channels between said projecting ribs.

9. The ball-point pen for low-viscosity aqueous ink according to claim 6, wherein said spring has a straight rod portion.

10. The ball-point pen for low-viscosity aqueous ink according to claim 6, wherein said spring consists of a pressing member having a straight rod for urging said tip ball and a coil spring.

11. A ball-point pen for a low viscosity aqueous ink according to claim 6, wherein said water-soluble polymer is a resin selected from the group consisting of polyacrylic acid, acrylic acid copolymer, maleic acid resin, a salt of polyacrylic acid, a salt of styrene-acrylic acid and a salt of styrene-maleic anhydride.

* * * * *